US 11,418,051 B2

(12) United States Patent
Suzuki et al.

(10) Patent No.: US 11,418,051 B2
(45) Date of Patent: Aug. 16, 2022

(54) DIRECT CURRENT POWER SUPPLYING SYSTEM

(71) Applicant: TDK CORPORATION, Tokyo (JP)

(72) Inventors: Shingo Suzuki, Tokyo (JP); Katsuo Naoi, Tokyo (JP); Takuma Mitsunaga, Tokyo (JP)

(73) Assignee: TDK CORPORATION, Tokyo (JP)

( * ) Notice: Subject to any disclaimer, the term of this patent is extended or adjusted under 35 U.S.C. 154(b) by 225 days.

(21) Appl. No.: 16/969,322

(22) PCT Filed: Feb. 21, 2018

(86) PCT No.: PCT/JP2018/006122
§ 371 (c)(1),
(2) Date: Aug. 12, 2020

(87) PCT Pub. No.: WO2019/163008
PCT Pub. Date: Aug. 29, 2019

(65) Prior Publication Data
US 2021/0050738 A1    Feb. 18, 2021

(51) Int. Cl.
*H02J 7/35*  (2006.01)
*H02J 1/10*  (2006.01)
*H02J 7/00*  (2006.01)

(52) U.S. Cl.
CPC .............. *H02J 7/35* (2013.01); *H02J 1/102* (2013.01); *H02J 7/0024* (2013.01)

(58) Field of Classification Search
CPC ........ H02J 7/35; H02J 1/10; H02J 7/00; H02J 1/102; H02J 7/0024
See application file for complete search history.

(56) References Cited

U.S. PATENT DOCUMENTS 6,741,065 B1    5/2004 Ishii et al.

FOREIGN PATENT DOCUMENTS

| JP | 2001-045673 | 2/2001 |
| JP | 3687464 | 6/2005 |
| JP | 2010-273519 | 12/2010 |

(Continued)

OTHER PUBLICATIONS

India Official Action, dated May 12, 2021 by Intellectual Property India, for the India Patent Application No. 202047035298.

(Continued)

*Primary Examiner* — Robert L Deberadinis
(74) *Attorney, Agent, or Firm* — Greenblum & Bernstein, P.L.C.

(57) ABSTRACT

An energy management system (controller) operates on a charging voltage Vba of a specified storage battery out of storage batteries to control power converting operations by bidirectional DC/DC converters. The energy management system controls the power converting operations of the respective bidirectional DC/DC converters so that the SOC of the specified storage battery is always higher than the SOCs of the other storage batteries, executes supplying of power from the other storage batteries to the DC bus with priority over supplying of power from the specified storage battery to the DC bus, and causes the corresponding bidirectional converters to stop the supplying of power from the other storage batteries the DC bus when the SOCs of the storage batteries have fallen below a lower limit value set in advance due to the supplying of power to the DC bus.

4 Claims, 1 Drawing Sheet

(56) References Cited

FOREIGN PATENT DOCUMENTS

| | | |
|---|---|---|
| JP | 2013-135533 | 7/2013 |
| JP | 2014-212645 | 11/2014 |
| JP | 2016-144301 | 8/2016 |
| JP | 2016-152641 | 8/2016 |
| WO | 2012/057032 | 5/2012 |

OTHER PUBLICATIONS

Official Communication issued in International Bureau of WIPO Patent Application No. PCT/JP2018/006122, dated Mar. 20, 2018.

DIRECT CURRENT POWER SUPPLYING SYSTEM

TECHNICAL FIELD

The present invention relates to a standalone direct current (DC) power supplying system that is not connected to commercial power.

BACKGROUND ART

A power supplying system (or "solar power generating device") disclosed in Patent Literature 1 indicated below is known as one example of a power supplying system that is capable of independent operation of a power circuit, which is supplied by a commercial power (the grid power), during a power cut. In this type of power supplying system, during independent operation, DC power stored in storage batteries is converted to power to be used in place of the grid power and is supplied to a load. With this type of power supplying system, in readiness for independent operation, it is preferable to keep the storage batteries fully charged or as close to fully charged as possible. When the storage batteries have not been sufficiently charged, the time for which the system can operate independently is shortened, and in some cases, there will be situations where it is not possible for the system to operate independently.

For this reason, in the power supplying system disclosed in Patent Literature 1, a plurality of AC arrays (systems that are each constructed of a solar cell, a storage battery, a power converter, a control device (controller), and the like) installed at distributed locations, each include a control device. The control device includes (a) a day/night determining means that determines, through software processing by a computer, day or night according to the magnitude of the voltage of the solar cell, (b) a charging/discharging monitoring means that monitors, through software processing by the computer, the voltage of the storage battery, and (c) a charging control means that controls, through software processing by the computer, based on determination by the day/night determining means and monitoring by the charging/discharging monitoring means, a charging operation of the power converter for charging until the voltage of the storage battery rises to a set fully charged voltage every time the voltage of the storage battery falls to a discharging limit voltage set in the vicinity of an overdischarging voltage during daytime when grid power is normal, and a charging operation of the power converter for charging until the voltage of the storage battery rises to the fully charged voltage every time the voltage of the storage battery falls to a lower limit voltage for the charging state that is higher than the discharging limit voltage during night-time when grid power is normal. By doing so, the control device controls the power converter to perform one of interconnected operation, independent operation, and charging operation.

In short, in this power supplying system, the control device of each AC array preferentially executes the interconnected operation during daytime when the grid power is normal. Only when the storage battery has been discharged to the discharging limit voltage or below due to independent operation of the power circuit during a power cut, a charging operation is executed after the grid power is restored and the storage battery is quickly charged to the fully charged state. Also, in a state where the grid power is normal and it is night-time, when the storage battery has fallen to a lower limit voltage of a charge maintaining state due to natural discharging or the like, a charging operation is executed to ensure that the storage battery is reliably kept in the fully charged state. This means that according to this power supplying system, since interconnected operation is given priority during daytime and a discharged storage battery can be charged promptly regardless of day and night, it is possible to keep the storage battery in the fully charged state as much as possible in readiness for the next independent operation.

CITATION LIST

Patent Literature

Patent Literature 1

Japanese Patent No. 3,687,464 (see pages 2-4 and FIG. 1)

SUMMARY OF INVENTION

Technical Problem

On the other hand, unlike the power supplying system disclosed in Patent Literature 1, there are also power supplying systems that are not connected to a grid power (hereinafter, also referred to as "standalone power supplying systems"). In a standalone power supplying system, in each component element that corresponds to the "AC arrays" described above (component elements constructed of a solar cell, a storage battery, a power converter, and a control device, hereinafter also referred to as "arrays"), the control device executes operations corresponding to the independent operation and charging operation described above based on generated power of the solar cell during daytime when the solar cell is generating power. The power converter also executes discharging operations and charging operations based on the generated power. On the other hand, at night when the solar cell does not generate power, the control device executes an operation corresponding to the independent operation described above based on the charging power of the storage battery. In this case, the power converter also executes a discharging operation based on the charging power.

However, in this type of standalone power supplying system, since a storage battery cannot be charged at night, if the voltage of the storage battery (hereinafter, referred to as the "charging voltage") falls to a lower limit voltage of the operating voltage range of the control device itself due to the control device continuously performing an operation corresponding to the independent operation during night-time, there is the risk that the control device will fall into an inoperable state. This means that with this standalone power supplying system, when the night is over and it becomes daytime, even if the solar cell has started a power generating operation, there is the risk that control for switching the power converter from a discharging operation during the night-time to a charging operation during daytime will not be performed, that is, a risk of entering a state where the arrays cannot be restarted.

For this reason, to avoid this situation, in all of the arrays in the standalone power supplying system, it would be conceivable to use a configuration where a sleep transition voltage that is higher than the lower limit voltage of the operating voltage range is set in advance for the control device, and when the charging voltage has fallen to the sleep transition voltage during the night, the control device disconnects the storage battery from the power circuit (as one example, a switch is disposed between the storage battery and the power converter or between the power converter and the power circuit and this switch is turned off) to sufficiently extend the period until the charging voltage of the storage battery reaches the lower limit voltage of the operating voltage range (that is, the period for which the control device is maintained in the operating state).

However, in a standalone power supplying system of this configuration, since the sleep transition voltage is set higher than the discharging limit voltage of the storage battery, there is the problem to be solved that in every array, it is not possible to make use of the entire discharging capability of the storage battery (a situation where it is not possible to make effective use of all of the power that could be discharged from the storage battery until the charging voltage of the storage battery reaches the discharging limit voltage from the sleep transition voltage).

The present invention was conceived in view of the problem described above and has a principal object of providing a standalone DC power supplying system that can make more effective use of the power stored in a plurality of storage batteries while sufficiently extending a period for which a controller can be kept in an operating state.

Solution to Problem

To achieve the stated object, a direct current (DC) power supplying system according to the present invention is a standalone DC power supplying system that is not connected to commercial power, comprising: a DC bus that serves as a bus line for supplying power; a power generator; a first converter that supplies generated power generated by the power generator to the DC bus; a plurality of storage batteries; a plurality of bidirectional converters that are each connected between one of the plurality of storage batteries and the DC bus, each bidirectionally convert power between the generated power supplied to the DC bus and charging power for the corresponding storage battery, and each supply power from the DC bus to the storage battery and from the storage battery to the DC bus; a second converter that converts DC power that is at least one of the generated power and the charging power supplied to the DC bus to a DC voltage and supplies the DC voltage to a load appliance; and a controller that operates on the charging power of a specified storage battery out of the plurality of storage batteries to control power converting operations of the plurality of bidirectional converters, wherein the controller controls the power converting operations of the plurality of bidirectional converters so that an SOC of the specified storage battery is always higher than SOCs of other storage batteries out of the plurality of storage batteries, executes supplying of power from the other storage batteries to the DC bus with priority over supplying of power from the specified storage battery to the DC bus and, when the SOCs of the other storage batteries have fallen below a lower limit value set in advance due to supplying of power to the DC bus, causes the corresponding bidirectional converters to stop supplying of power from the other storage batteries to the DC bus.

According to the present invention, since the SOC of the specified storage battery whose charging power is used to operate the controller is always higher than the SOCs of the other storage batteries, unlike a configuration where all of the storage batteries are used equally to supply power to the DC bus, it is possible to sufficiently extend the time required for the SOC of the specified storage battery to fall to the lower limit value, that is, it is possible to sufficiently extend the time for which the controller can be kept in the operating state. Also, since the present invention is configured so that when supplying power to the DC bus, the other storage batteries are discharged with priority and supplying of power to the DC bus is stopped when the SOC reaches the lower limit value, it is possible to make effective use of the charging power of the other storage batteries right up to a point just before over-discharging occurs while reliably avoiding a situation where the other storage batteries become overdischarged.

The plurality of bidirectional converters should preferably operate on the charging power of the corresponding storage batteries out of the plurality of storage batteries, and the controller should preferably stop the bidirectional converters corresponding to the other storage batteries whose SOC has fallen below the lower limit value. Here, by stopping the bidirectional converters (by placing the bidirectional converters in the sleep state), it is possible to reduce the power consumption at the bidirectional converters. By doing so, it is possible to reduce the power consumption of the DC power supplying system as a whole.

Also, the DC power supplying system should preferably comprise a third converter that converts the charging power of the specified storage battery to an operating voltage of the controller and outputs the operating voltage. Here, even when the SOC of the specified storage battery has changed (that is, when the charging voltage of the specified storage battery has changed), the third converter is still capable of stably outputting an operating voltage of the voltage value used by the controller.

Advantageous Effects of Invention

According to the present invention, since it is possible to sufficiently extend the time required for the SOC of a specified storage battery to fall to the lower limit value, it is possible to keep a controller that operates on charging power of the specified storage battery in an operating state for a sufficiently long period. In addition, the charging power of other storage batteries can be effectively used right up to a point just before over-discharging.

DESCRIPTION OF EMBODIMENTS

Preferred embodiments of a DC power supplying system will now be described with reference to the attached drawings. Note that the DC power supplying system according to the present invention is not limited to the embodiments described below. The component elements described below also include component elements that would be obvious to those skilled in the art and component elements that are effectively the same, with it also being possible to combine such component elements as appropriate.

Figure 1:
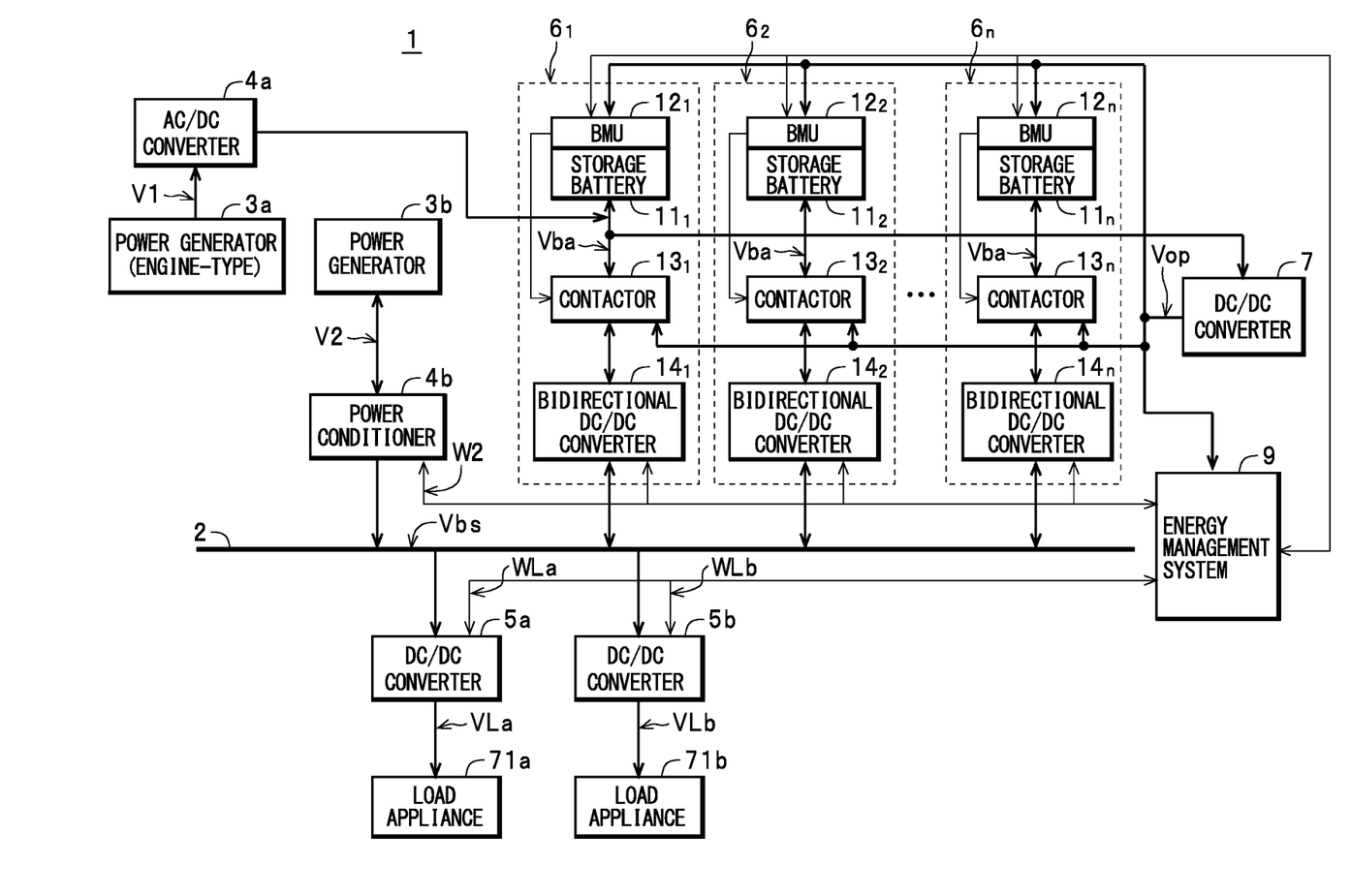
FIG. 1 is a diagram depicting the configuration of a DC power supplying system 1.

First, the configuration of a DC power supplying system 1 as a DC power supplying system according to the present invention will be described.

The DC power supplying system 1 includes a DC bus 2, one or two or more power generators 3 (as one example in the present embodiment, two power generators 3a and 3b, hereinafter collectively referred to as the "power generators 3" when no distinction is made between them), converters 4 disposed corresponding to the power generators 3 (as one example in the present embodiment, two converters composed of an AC/DC converter 4a and a power conditioner 4b described later), second converters 5 (as one example in the present embodiment, two second converters 5a and 5b described later, hereinafter collectively referred to as the "second converters 5" when no distinction is made between them) disposed corresponding to one or two or more load appliance(s) 71 connected to the DC power supplying system 1 (as one example in the present embodiment, two load appliances 71a and 71b, hereinafter collectively referred to as the "load appliances 71" when no distinction is made between them), a plurality of DC power supplies 6 (DC power supplies $6_1, 6_2, \ldots, 6_n$), a third converter 7, and an energy management system 9. The DC power supplying system 1 is configured as a standalone DC power supplying system that is capable of generating a DC voltage based on the power (or "generated power") generated by the power generators 3 and supplying to the load appliances 71 (that is, a DC power supplying system that is not connected to commercial power (that is, commercial AC power)).

The DC bus 2 is laid out along the installed locations of the power generators 3, the installed locations of the DC power supplies 6, and the installed locations of the load appliances 71, and functions as a bus line for supplying DC power. In addition, due to the energy management system 9 controlling charging/discharging operations (that is, power converting operations that convert power bidirectionally between the generated power supplied to the DC bus 2 and the charging power of the storage batteries 11, described later) by bidirectional DC/DC converters 14, described later, provided inside the plurality of DC power supplies 6, the DC bus 2 is set at a bus voltage Vbs in a predetermined voltage range that includes a nominal bus voltage (as one example, in a voltage range of DC 340V to DC 400V inclusive, including DC 370V as the nominal bus voltage).

The power generators 3 are constructed of distributed power supplies. The distributed power supplies can be composed of power generators that use natural renewable energy, such as solar power generators and wind power generators, and engine-based power generators that use fossil fuel energy, such as diesel or gasoline. In the present embodiment, for ease of understanding, the power generators 3 include one power generator 3a that is engine-based and one power generator 3b that uses natural renewable energy.

The power generator 3a is started and stopped by (manual) operations by an operator or is started and stopped according to instructions from the energy management system 9 (as one example in the present embodiment, the former), and when in an operating state, generates and outputs an AC voltage V1 of a predetermined voltage value. The power generator 3a is also used when the DC power supplying system 1 is first started up. As one example, the power generator 3b is composed of one or two or more solar power generators and generates and outputs a DC voltage V2.

In the present embodiment, the converters 4 are composed of two converters made up of the AC/DC converter 4a and the power conditioner 4b disposed corresponding to the two power generators 3a and 3b. As one example in the present embodiment, the AC/DC converter 4a is disposed corresponding to the power generator 3a. The AC/DC converter 4a operates on a DC voltage that is internally generated based on the AC voltage V1, converts the AC voltage V1 as the generated power outputted from the power generator 3a to a DC voltage (the charging voltage Vba) for use in charging operations, and supplies the DC voltage to specified storage batteries 11, described later.

As one example, the power conditioner 4b includes a DC/DC converter and is disposed as a first converter corresponding to the power generator 3b. The power conditioner 4b operates on a DC voltage that is internally generated based on the DC voltage V2, is controlled by the energy management system 9 to control the generated power by controlling power generating operations of the corresponding power generator 3b, converts the DC voltage V2 as the generated power outputted from the power generator 3b to the bus voltage Vbs, and supplies the bus voltage Vbs to the DC bus 2. The power conditioner 4b also has a power measuring function that measures generated power W2 supplied from the power generator 3b to the DC bus 2 (that is, measures for the cycle T, for example) and outputs to the energy management system 9.

As one example, the second converters 5 are constructed of DC/DC converters that operate on a DC voltage that is internally generated based on the bus voltage Vbs. In the present embodiment, for ease of understanding, it is assumed for example that the load appliances 71 (DC loads) connected to the DC power supplying system 1 are the two load appliances 71a and 71b and that the second converters 5 are composed of a second converter 5a (also referred to as the "DC/DC converter 5a") corresponding to the load appliance 71a and a second converter 5b (also referred to as the "DC/DC converter 5b") corresponding to the load appliance 71b. Here, the DC/DC converter 5a is controlled by the energy management system 9, converts the bus voltage Vbs to a load voltage VLa that is the DC voltage to be used by the load appliance 71a (DC voltage conversion) and supplies the load voltage VLa to the load appliance 71a. The DC/DC converter 5a has a current limiting function that limits the load current supplied from the DC bus 2 to the load appliance 71a to an upper limit current value set from the energy management system 9. The DC/DC converter 5a also has a power measuring function that measures load power WLa supplied from the DC bus 2 to the load appliance 71a based on the load voltage VLa and the load current (as one example, measurement in the cycle T) and outputs the load power WLa to the energy management system 9.

The DC/DC converter 5b is controlled by the energy management system 9, converts the bus voltage Vbs to a load voltage VLb that is the DC voltage to be used by the load appliance 71b (DC voltage conversion) and supplies the load voltage VLb to the load appliance 71b. The DC/DC converter 5b has a current limiting function that limits the load current supplied from the DC bus 2 to the load appliance 71b to an upper limit current value set from the energy management system 9. The DC/DC converter 5b also has a power measuring function that measures load power WLb supplied from the DC bus 2 to the load appliance 71b based on the load voltage VLb and the load current (as one example, measurement in the cycle T) and outputs the load power WLb to the energy management system 9.

Note that the load appliances 71a and 71b are DC loads that receive and operate on a supplying of the load voltages VLa and VLb that are DC voltages (hereinafter referred to as the "load voltages VL" when no distinction is made between them), and as examples, the load appliances 71a and 71b are composed of lighting equipment that operates on a DC voltage, home appliances such as televisions and refrigerators that operate on a DC voltage, and information devices, such as personal computers and mobile terminals that operate on a DC voltage.

n (where n is an integer of 2 or higher) DC power supplies $6_1, 6_2, \ldots, 6_n$ (hereinafter collectively referred to as the "DC power supplies 6" when no distinction is made between them) are disposed as the DC power supplies 6. Each DC power supply 6 includes a storage battery 11, a battery management unit (BMU) 12, a contactor 13, and a bidirectional DC/DC converter 14.

The storage batteries $11_1, 11_2, \ldots, 11_n$ (hereinafter, also referred to as the "storage batteries 11" when no particular distinction is made between them) can be constructed of lithium ion batteries, lead acid storage batteries, nickel-metal hydride batteries, NAS batteries (sodium-sulfur batteries), or the like. As one example, each storage battery 11 has the same specified power capacity (the same nominal capacity). Out of the storage batteries 11, other storage batteries 11 aside from a specified storage battery 11 described later are used to supply power to the DC bus 2, and for this reason the storage batteries 11 are configured so that charging operations and discharging operations are possible in a range from a state (or "fully charged state") where the SOC (State Of Charge: remaining battery level) is 100% to a state where the SOC is at a lower limit value (one example, several percent) set in advance that is just before overcharging occurs. This means that the charged power (charging power) can be almost entirely used in discharging operations (that is, the charging power can be effectively used).

As one example in the present embodiment, specified storage batteries 11 out of the storage batteries $11_1$ to $11_n$ (a single storage battery $11_1$, the storage battery $11_1$, as one example in the present embodiment, but any plural number of storage batteries 11 that is fewer than the number of non-specified storage batteries 11 may be used) are used to supply power to the DC bus 2 in the same way as the other storage batteries 11. However, unlike the other storage batteries 11, these specified storage batteries 11 are mainly used to supply power for operations of the respective BMUs 12 and contactors 13 of the DC power supplies $6_1$ to $6_n$, and operations of the energy management system 9. That is, each specified storage battery 11 mainly functions as a storage battery 11 that supplies power for generating an operating voltage Vop, described later (that is, the voltage for operating each BMU 12, each contactor 13, and the energy management system 9).

Here, the specified storage battery 11 that supplies power to the respective BMUs 12, the contactors 13, and the energy management system 9 is charged by the power generator 3a as described later when the DC power supplying system 1 is started up. After this, even when the power generator 3a has stopped, until the power generator 3b starts generating power and becomes able to charge the specified storage battery 11 (that is, until a power surplus is generated), the respective BMUs 12, the contactors 13, and the energy management system 9 are supplied with power from the specified storage battery 11 and continue operating. When the generated power is insufficient, a charging/discharging control process that causes the DC power supplies 6 to execute discharging from the storage batteries 11 is executed, and when there is a power surplus, it is necessary to switch from a charging/discharging control process for discharging and instead execute a charging/discharging control process that causes the DC power supplies 6 to execute charging of the storage batteries 11.

For this reason, the specified storage battery 11 is subjected to charging/discharging control by the energy management system 9 so that the SOC of the specified storage battery 11 is always higher than the SOCs of the other storage batteries 11. In more detail, when the specified storage battery 11 is charged by the power supplied from the DC bus 2, the specified storage battery 11 is charged with priority over the other storage batteries 11 and is charged until the SOC reaches 100% (until a fully charged state is reached). After this, charging of the other storage batteries 11 starts. When the other storage batteries 11 have also been charged until the SOC is 100%, a state is produced where the SOC of the specified storage battery 11 is the same as the SOCs of other storage batteries 11 at 100%, but until the SOCs of the other storage batteries 11 reach 100%, charging/discharging control is performed so that the SOC of the specified storage battery 11 is always higher than the SOCs of the other storage batteries 11. Note that when the specified storage battery 11 is supplied with power for charging from the corresponding bidirectional DC/DC converter 14 (in the present embodiment, the bidirectional DC/DC converter $14_1$), some power is used as the power used to generate the operating voltage Vop for the BMUs 12, the contactors 13, and the energy management system 9.

When the specified storage battery 11 is to supply power to the DC bus 2 through discharging, charging/discharging control is performed so that this discharging of the specified storage battery 11 to the DC bus 2 starts after the other storage batteries 11 have all been discharged until their respective SOCs have reached the lower limit value for the SOC, and when the SOC of the specified storage battery 11 reaches a lower limit value set in advance for the specified storage battery 11 (hereinafter, "specified first lower limit value" (a higher value than the lower limit value for the other storage batteries 11)), discharging to the DC bus 2 is stopped. When power is supplied to the DC bus 2, the power discharged from the specified storage battery 11 is supplied to the corresponding bidirectional DC/DC converter 14 (the bidirectional DC/DC converter $14_1$), and is also used as the power used to generate the operating voltage Vop for the respective BMUs 12, the respective contactors 13, and the energy management system 9. However, since the SOCs of the other storage batteries 11 have all already reached the lower limit value, charging/discharging control is performed so that the SOC of the specified storage battery 11 is always higher than the SOC of the other storage batteries 11.

In addition, even after the specified storage battery 11 stops discharging to the DC bus 2 (that is, after stopping the supplying of power to the corresponding bidirectional DC/DC converter $14_1$), the specified storage battery 11 continues to supply the power used to generate the operating voltage Vop for the respective BMUs 12, the respective contactors 13, and the energy management system 9. In this case, since the SOC of the specified storage battery 11 when discharging to the DC bus 2 stops is the specified first lower limit value that is higher than the lower limit value for the other storage batteries 11, a discharging operation is performed until the SOC falls from this specified first lower limit value to reach the lower limit value, which means that the supplying of the power used to generate the operating voltage Vop continues.

Accordingly, in the DC power supplying system 1, the specified first lower limit value is set in advance so that during a period from when there is no longer any power surplus (as one example, when the power generator 3b stops generating power) until the next time power surplus is generated (as one example, when the power generator 3b starts generating power), the specified storage battery 11 is able to continue supplying the power used to generate the operating voltage Vop described above. Although it is possible to set the specified first lower limit value at an arbitrary value that is higher than the lower limit value (for example, several percent) for the other storage batteries 11 and in a range from that lower limit value to 100%, to ensure that the specified storage battery 11 is sufficiently capable of continuing to supply the power used to generate the operating voltage Vop, it is preferable to set a value as high as possible, such as several tens of percent. When the specified first lower limit value is set at 100%, the specified storage battery 11 does not supply power to the DC bus 2 and functions as a storage battery that only supplies power for generating the operating voltage Vop.

BMUs $12_1, 12_2, \ldots, 12_n$ (hereinafter collectively referred to as the "BMUs 12" when no distinction is made between them) are disposed for the corresponding storage batteries $11_1, 11_2, \ldots, 11_n$ and operate on the operating voltage Vop, described later. In the operating state, as examples, each BMU 12 has a function that measures the charging voltage Vba of the storage battery 11, a function that calculates the SOC of the storage battery 11, and a function of outputting, with a predetermined cycle T, information including the measured charging voltage Vba and/or the calculated SOC to the energy management system 9 as battery information. The BMU 12 also has a function which executes, when contactor control information has been inputted from the energy management system 9, a control content over the contactor 13 as indicated by the contactor control information (when the control content is a cutoff instruction, the contactor 13 is placed in the cutoff state and when the control content is a connection instruction, the contactor 13 is placed in the connection state). Note that each BMU 12 stores in advance a data table indicating the relationship between the charging voltage Vba and the SOC of the corresponding storage battery 11 (a relationship where the SOC increases as the charging voltage Vba increases) and each BMU 12 is configured to find (calculate) the present SOC from the measured charging voltage Vba by referring to this data table.

The contactors $13_1, 13_2, \ldots, 13_n$ (hereinafter collectively referred to as the "contactors 13" when no distinction is made between them) are disposed between the positive electrode and the negative electrode of the corresponding storage batteries $11_1, 11_2, \ldots, 11_n$ and a pair of input/output terminals on the storage battery $11_1, 11_2, \ldots, 11_n$-sides of the corresponding bidirectional DC/DC converters $14_1, 14_2, \ldots, 14_n$ and operate on the operating voltage Vop described later. The respective contactors 13 are controlled by the corresponding BMUs 12 to enter an arbitrary state out of the cutoff state and the connection state. When in the cutoff state, the contactors 13 cut off (that is, disconnect) the positive electrode and the negative electrode from the pair of input/output terminals, and when in the connection state, the contactors 13 connect the positive electrode and the negative electrode to the pair of input/output terminals.

The bidirectional DC/DC converters $14_1, 14_2, \ldots, 14n$ (hereinafter collectively referred to as the "bidirectional DC/DC converters 14" when no distinction is made between them) connect (that is, are disposed) between the corresponding storage battery 11 and the DC bus 2 as described above by each having a pair of input/output terminals on the storage battery 11 side (that is "a first pair of input/output terminals") connected via the corresponding contactor 13 to the corresponding storage battery 11 and a second pair of input/output terminals connected to the DC bus 2.

Each bidirectional DC/DC converter 14 performs a CV operation (constant voltage charging/discharging operation) on a DC voltage that is internally generated based on the bus voltage Vbs and is subjected to operation control by the energy management system 9. In more detail, when the control information received from the energy management system 9 is a charging instruction, each bidirectional DC/DC converter 14 steps up or steps down (that is, performs voltage conversion for) the bus voltage Vbs inputted from the second pair of input/output terminals and outputs from the first pair of input/output terminals to the storage battery 11 to charge the storage battery 11 (that is, a charging operation is performed). Due to this, the bus voltage Vbs of the DC bus 2 falls. On the other hand, when the received control information is a discharging instruction, each bidirectional DC/DC converter 14 steps up or steps down (that is, performs voltage conversion for) the charging voltage Vba of the storage battery 11 inputted from the first pair of input/output terminals and outputs to the DC bus 2 from the second pair of input/output terminals to discharge the storage battery 11 (that is, a discharging operation is performed). Due to this, the bus voltage Vbs of the DC bus 2 rises. As the bidirectional DC/DC converters 14, as one example it is possible to use the known bidirectional DC/DC converters disclosed in Japanese Laid-open Patent Publication No. 2016-152641.

Each bidirectional DC/DC converter 14 also has a current limiting function that limits the current values of the charging current supplied to the storage battery 11 and the discharging current when discharging from the storage battery 11 to a maximum current value of the storage battery 11 or below.

The third converter 7 is composed of a DC/DC converter (and is hereinafter also referred to as the "DC/DC converter 7"). The DC/DC converter 7 operates on a charging voltage Vba supplied from a specified storage battery 11 (in the present embodiment, the storage battery $11_1$) out of the storage batteries $11_1$ to $11_n$ (which is also a voltage supplied from the AC/DC converter 4a when the DC power supplying system 1 is started up). Here, when the SOC of the specified storage battery 11 (in the present embodiment, the storage battery $11_1$) exceeds the lower limit value, the DC/DC converter 7 receives supplying of power from the specified storage battery 11, enters the operating state, and generates, based on this power, and outputs the operating voltage Vop to be used by the BMU 12 and the contactor 13 of each DC power supply 6 and also by the energy management system 9 (in more detail, the charging voltage Vba of the specified storage battery $11_1$ is stepped up or stepped down (that is, subjected to voltage conversion) to generate and output the operating voltage Vop). Note that since the DC/DC converter 7 cannot enter an operating state when the SOC of the specified storage battery 11 (storage battery $11_1$) is equal to or below the lower limit value, generation and outputting of the operating voltage Vop stops.

The energy management system 9 is composed of a computer that operates on the operating voltage Vop and functions as a controller. The energy management system 9 executes a charging/discharging control process for each DC power supply 6 and a power control process over the second converters 5. The energy management system 9 also executes a voltage measuring process that measures the bus voltage Vbs. Here, the energy management system 9 may use a configuration that directly measures the bus voltage Vbs, and as another example, it is also possible to use a configuration where the power conditioner 4b as a first converter has a function that measures the bus voltage Vbs in addition to generated power and outputs to the energy management system 9 and the energy management system 9 indirectly measures the bus voltage Vbs via the power conditioner 4b.

Next, the operation of the DC power supplying system 1 depicted in FIG. 1 will be described. It is assumed that the respective contactors 13 are in the cutoff state at the start.

With the DC power supplying system 1, when the DC power supplying system 1 is first driven, the power generator 3*a* first operates for a certain period to output the AC voltage V1. For this reason, the AC/DC converter 4*a* operates on being supplied with the AC voltage V1, converts the AC voltage V1 to a DC voltage, and supplies to the specified storage battery/batteries 11 (in the present embodiment, the storage battery 11$_1$). Accordingly, the charging voltage Vba of the storage battery 11$_1$ rises, and due to this, the SOC also rises. When the SOC of the storage battery 11$_1$ becomes equal to or higher than the lower limit value, the DC/DC converter 7 starts outputting the operating voltage Vop. By doing so, the BMU 12 and the contactor 13 of each DC power supply 6 and the energy management system 9 are supplied with the operating voltage Vop and enter the operating state. Due to the power generator 3*a* operating for the certain period only, the storage battery 11$_1$ is charged to a state where the SOC is sufficiently higher than the lower limit value. This means that even after the power generator 3*a* stops, the DC/DC converter 7 is capable of continuously outputting the operating voltage Vop based on the power supplied from the storage battery 11$_1$ until the power generator 3*b* starts operating and power surplus is produced.

Accordingly, the BMUs 12$_1$ to 12$_n$ of the DC power supplies 6$_1$ to 6$_n$ in the operating state measure the charging voltage Vba, the SOC, or the like of the corresponding storage batteries 11$_1$ to 11$_n$ with the cycle T and output to the energy management system 9 as the battery information every time measurement is performed. The energy management system 9 in the operating state also executes the charging/discharging control process.

When this certain period has elapsed, the power generator 3*a* is stopped. Here, the power generator 3*a* may be configured so that a timer (not illustrated) provided in the power generator 3*a* itself measures the operating time and the power generator 3*a* stops by itself when the operating time becomes equal to the certain period. It is also possible to use a configuration where the energy management system 9 that has received supplying of the operating voltage Vop and started operating measures the elapsed time from the start of operation as the operating time of the power generator 3*a* and stops the power generator 3*a* when this elapsed time has become equal to the certain period. By doing so, after the end of the certain period, the DC power supplying system 1 enters the normal operation state where only the power generator 3*b* operates to generate power. Since it is assumed that the power generator 3*a* is composed of an engine-based power generator that uses fossil fuel energy, such as diesel and gasoline, it is desirable to use the power generator 3*a* only for an extremely short period of time.

In the DC power supplying system 1 in this normal operation state, the energy management system 9 executes the following charging/discharging control process.

First, when the power generator 3*b* is generating power, the power conditioner 4*b* operates on receiving the DC voltage V2 supplied from the power generator 3*b*, converts the DC voltage V2 into the bus voltage Vbs, and supplies the bus voltage Vbs to the DC bus 2. Accordingly, the bus voltage Vbs of the DC bus 2 rises to within the predetermined voltage range (the voltage range of DC 340V to DC 400V inclusive). The power conditioner 4*b* also measures the generated power W2 supplied from the power generator 3*b* to the DC bus 2 and outputs to the energy management system 9.

In the charging/discharging control process during generation of power by the power generator 3*b*, the energy management system 9 first acquires a new generated power W2 from the power conditioner 4*b* of the power generator 3*b* and when the generated power W2 is equal to or above a standard power set in advance, the energy management system 9 determines that it is possible to supply power to the load appliances 71 and executes control that causes the DC/DC converters 5*a* and 5*b* to convert and output the bus voltage Vbs so as to become the load voltages VLa and VLb used by the corresponding load appliances 71*a* and 71*b*. By doing so, the DC/DC converters 5*a* and 5*b* execute the supplying of load power to the corresponding load appliances 71*a* and 71*b*. The DC/DC converters 5*a* and 5*b* also measure the load power WLa and WLb supplied to the corresponding load appliances 71*a* and 71*b* and output to the energy management system 9. The energy management system 9 acquires this load power WLa and WLb and calculates the total load power (WLa+WLb).

Next, the energy management system 9 compares the generated power W2 and the total load power (WLa+WLb) and when the generated power W2 is above the total load power (WLa+WLb) (as one example, when the insolation amount is high, so that the generated power W2 of the power generator 3*b* is large), a power surplus is produced, so that the energy management system 9 determines that it is possible for the respective DC power supplies 6 to charge the storage batteries 11.

When the result of the comparison is that the generated power W2 is larger than the total load power (WLa+WLb) and it has been determined that charging is possible (that is, a power surplus has been produced), the energy management system 9 specifies which DC power supplies 6 have chargeable storage batteries 11 (that is, storage batteries 11 whose SOC has not reached 100%) based on the battery information acquired from the BMU 12 of each DC power supply 6, outputs contact control information indicating a connection instruction to the BMUs 12 of the specified DC power supplies 6, and outputs control information indicating a charging instruction to the bidirectional DC/DC converters 14 of these DC power supplies 6 (that is, the energy management system 9 executes a charging operation).

As one example, when the SOCs of all of the storage batteries 11 including the storage battery 11$_1$ are under 100%, the energy management system 9 detects that none of the storage batteries 11 are fully charged (that is, all of the storage batteries 11 are in a chargeable state) based on the SOCs of the respective storage batteries 11 included in the battery information. For this reason, the energy management system 9 outputs contact control information indicating a connection instruction to the BMUs 12$_1$ to 12$_n$ of all of the DC power supplies 6$_1$ to 6$_n$ and also outputs control information indicating a charging instruction to the bidirectional DC/DC converters 14$_1$ to 14$_n$ of all of the DC power supplies 6$_1$ to 6$_n$.

By doing so, in each DC power supply 6, since the contactor 13 is placed in a connection state, the storage battery 11 is connected via the contactor 13 in the connection state to the bidirectional DC/DC converter 14 that performs a charging operation, and as a result, charging of the storage battery 11 is executed. Here, the energy management system 9 detects whether the SOC included in the battery information outputted in the cycle T from the BMU 12 of each DC power supply 6 has reached 100% (that is, whether the storage battery 11 has reached the fully charged state) and on determining that the fully charged state has been reached, the energy management system 9 outputs contact control information indicating a cutoff instruction to the BMU 12 of the DC power supply 6 that includes that storage battery 11 to place that contactor 13 in a cutoff state and thereby disconnect that storage battery 11 from the bidirectional DC/DC converter 14. By doing so, overcharging of the storage batteries 11 is prevented.

However, when the energy management system 9 has specified the DC power supplies 6 with chargeable storage batteries 11, when the DC power supply $6_1$ with the specified storage battery $11_1$ is included in the specified DC power supply 6, a charging operation that prioritizes charging of the specified storage battery $11_1$ over the other storage batteries $11_2$ to $11_n$ is executed.

In more detail, the energy management system 9 first outputs control information indicating a charging instruction to the bidirectional DC/DC converter $14_1$ of the DC power supply $6_1$ with the specified storage battery $11_1$ so that the specified storage battery $11_1$ is charged until the SOC becomes 100%. Note that since the specified storage battery $11_1$ constantly supplies the power used to generate the operating voltage Vop to the DC/DC converter 7, if charging were to completely stop after charging until the SOC reaches 100%, the SOC would thereafter gradually fall from 100%. For this reason, the energy management system 9 outputs control information indicating a charging instruction to the bidirectional DC/DC converter $14_1$ based on the SOC of the storage battery $11_1$ included in the battery information so that the SOC is maintained at 100%.

After this, the energy management system 9 outputs control information indicating a charging instruction to the bidirectional DC/DC converters $14_2$ to $14_n$ of the DC power supplies $6_2$ to $6_n$ with the other storage batteries $11_2$ to $11_n$ to charge the other storage batteries $11_2$ to $11_n$ until their respective SOCs reach 100%. In this way, the energy management system 9 performs charging/discharging control of the respective storage batteries 11 so that the SOC of the specified storage battery $11_1$ is always higher than the SOCs of the other storage batteries $11_2$ to $11_n$ (when the SOCs of the other storage batteries $11_2$ to $11_n$ have also become 100%, the SOCs of all of the storage batteries 11 will actually be equal at 100%, but at all other times, the SOC of the storage battery $11_1$ will always be higher).

When executing a charging operation, the energy management system 9 controls the number of DC power supplies 6 that execute a charging operation and/or the time for which a charging operation is performed to control the charging power supplied from the DC bus 2 to the respective DC power supplies 6 and thereby keep the bus voltage Vbs, which is measured by executing the voltage measurement process, within the predetermined voltage range described above (the voltage range of DC 340V to DC 400V inclusive). If the energy management system 9 is not capable of controlling a rise in the bus voltage Vbs by charging only the specified storage battery $11_1$, the energy management system 9 controls the rise in the bus voltage Vbs by also charging the other storage batteries $11_2$ to $11_n$ while the specified storage battery $11_1$ is being charged (in more detail, by executing charging while controlling the number of DC power supplies $6_2$ to $6_n$ that execute a charging operation and/or the time for which a charging operation is performed). Note that in this case also, the energy management system 9 performs charging/discharging control of the respective storage batteries 11 so that the SOC of the specified storage battery $11_1$ is always higher than the SOCs of the other storage batteries $11_2$ to $11_n$.

On the other hand, when as a result of comparing the generated power (W2) and the total load power (WLa+ WLb), the generated power (W2) is smaller than the total load power (WLa+WLb) (for example, when the insolation amount is low, so that the generated power W2 of the power generator $3b$ is low), a power insufficiency is produced, so that the energy management system 9 determines that it is necessary to discharge from the storage batteries 11 of the DC power supplies 6. In this case, the energy management system 9 specifies the DC power supplies 6 with storage batteries 11 capable of being discharged based on the battery information (in more detail, the SOCs) acquired from the BMUs 12 of the respective DC power supplies 6, outputs contact control information indicating a connection instruction to the BMUs 12 of the specified DC power supplies 6, and outputs control information that indicates a discharging instruction to the bidirectional DC/DC converters 14 of these DC power supplies 6 (that is, the bidirectional DC/DC converters 14 are caused to execute a discharging operation).

Here, in the DC power supplying system 1, since the storage battery $11_1$ is configured as described above so as to always be charged so that the SOC is substantially 100%, the energy management system 9 always specifies the DC power supply $6_1$ as a DC power supply 6 with a storage battery 11 that is capable of being discharged. When the energy management system 9 specifies any DC power supply 6 out of the DC power supplies $6_2$ to $6_n$ as a DC power supply 6 with a storage battery 11 that is capable of being discharged (that is, a DC power supply 6 where the SOC of the storage battery 11 exceeds the lower limit value described above for the SOC), the DC power supply 6 in question is specified as a DC power supply 6 with a storage battery 11 that is capable of being discharged. Also, when the specified DC power supplies 6 include DC power supplies 6 aside from the DC power supplies 6 with the specified storage battery/batteries 11 (in the present embodiment, the DC power supply $6_1$) (or in other words, a DC power supply 6 with another storage battery 11 aside from the specified storage battery 11. In the present embodiment, any of the DC power supplies $6_2$ to $6_n$), the energy management system 9 also causes such DC power supplies 6 to perform a discharging operation with priority over the DC power supply $6_1$. An example where DC power supplies 6 aside from the DC power supply $6_1$ are included in the specified DC power supplies 6 will now be described.

In this example, to have any of the DC power supplies 6 described above (that is, any specified DC power supply 6 out of the DC power supplies $6_2$ to $6_n$) execute a discharging operation, the energy management system 9 first outputs contact control information indicating a connection instruction to the BMU 12 of that DC power supply 6 and outputs control information indicating a discharging instruction to the bidirectional DC/DC converter 14. In each of these DC power supplies 6, the BMU 12 connects the storage battery 11 to the bidirectional DC/DC converter 14 by placing the contactor 13 in the connection state based on the contact control information indicating a connection instruction acquired from the energy management system 9. In addition, the bidirectional DC/DC converter 14 that is performing a discharging operation based on control information indicating a discharging instruction acquired from the energy management system 9 steps up or steps down (that is, performs voltage conversion for) the charging voltage Vba of the storage battery 11 and outputs to the DC bus 2 (that is, the storage battery 11 is discharged).

Here, the energy management system 9 controls the discharging power supplied from the DC power supplies 6 to the DC bus 2 by controlling the number of DC power supplies 6 that execute a discharging operation and/or the time for which a discharging operation is performed to keep the bus voltage Vbs, which is measured by executing the voltage measurement process, within the predetermined voltage range described above (the voltage range of DC 340V to DC 400V inclusive).

When, as a result of any of the DC power supplies 6 (that is, a DC power supply 6 aside from the DC power supply $6_1$) continuously executing the discharging operation described above, the SOC of a storage battery 11 has reached the lower limit value and this is detected based on the battery information acquired from the BMU 12, the energy management system 9 outputs contact control information indicating a cutoff instruction to the BMU 12 of that DC power supply 6. By doing so, in the DC power supply 6, since the BMU 12 places the contactor 13 in the cutoff state, the storage battery 11 is disconnected from the bidirectional DC/DC converter 14 (that is, the discharging operation is stopped). This prevents a situation where a storage battery 11 is discharged in a state where the SOC is below the lower limit value (that is, over-discharging of the storage battery 11).

When discharging operations have been stopped for all DC power supplies 6 aside from the DC power supply $6_1$ out of the specified DC power supplies 6 (that is, when the SOCs of the storage batteries 11 of all of the specified power supplies 6 aside from the DC power supply $6_1$ have reached the lower limit value), the energy management system 9 then causes the DC power supply $6_1$ to perform a discharging operation. Here, the energy management system 9 outputs contact control information indicating a connection instruction to the BMU $12_1$ of the DC power supply $6_1$ and outputs control information indicating a discharging instruction to the bidirectional DC/DC converter $14_1$. At the DC power supply $6_1$, the BMU $12_1$ connects the storage battery $11_1$ to the bidirectional DC/DC converter $14_1$ by placing the contactor $13_1$ in the connected state based on the contact control information indicating a connection instruction acquired from the energy management system 9. In addition, the bidirectional DC/DC converter $14_1$, which performs a discharging operation based on the control information indicating a discharging instruction acquired from the energy management system 9, steps up or steps down (that is, performs voltage conversion for) the charging voltage Vba of the storage battery $11_1$ and outputs to the DC bus 2 (that is, the storage battery $11_1$ is discharged).

In this case also, the energy management system 9 controls the time for which the DC power supply $6_1$ executes a discharging operation to control the discharging power supplied from the DC power supply 6 to the DC bus 2 so that the bus voltage Vbs, which is measured by executing the voltage measurement process, is kept within the predetermined voltage range described above (the voltage range of DC 340V to DC 400V inclusive).

When, as a result of the discharging operation described above having been continuously executed at the DC power supply $6_1$, the SOC of the storage battery $11_1$ has fallen and reached the specified first lower limit value and this has been detected based on (the SOC in) the battery information acquired from the BMU $12_1$, the energy management system 9 outputs contact control information indicating a cutoff instruction to the BMU $12_1$ of the DC power supply $6_1$. As a result, at the DC power supply $6_1$, the contactor $13_1$ is placed in the cutoff state by the BMU $12_1$, so that the storage battery $11_1$ is disconnected from the bidirectional DC/DC converter 14 (that is, the discharging operation to the DC bus 2 is stopped). By doing so, the energy management system 9 executes charging/discharging control that discharges the storage batteries 11 so that the SOC of the specified storage battery $11_1$ is always higher than the SOCs of the other storage batteries $11_2$ to $11_n$. Since the storage battery $11_1$ is disconnected from the bidirectional DC/DC converter 14 in this way when the SOC has fallen to the specified first lower limit value, which is higher than the lower limit value, it is possible to supply power for generating the operating voltage Vop to the DC/DC converter 7 for a sufficiently long period while the SOC falls from the specified first lower limit value to the lower limit value.

By doing so, supplying of power from the DC power supplies 6 to the DC bus 2 is completely stopped. In the DC power supplying system 1, if the DC/DC converters 5a and 5b were to continue the operation described above in a state where the generated power W2 is smaller than the total load power (WLa+WLb), there would be a risk that the bus voltage Vbs would fall and drop below the lower limit voltage (DC 340V) of the predetermined voltage range (in the present embodiment, the range from DC 340V to DC 400V inclusive). For this reason, the energy management system 9 executes a power control process over the second converters 5 (in the present embodiment, at least one of the DC/DC converters 5a and 5b) to lower the total load power (WLa+WLb) (or increase the total load power (WLa+WLb) when the generated power W2 has increased) so that the bus voltage Vbs, which is measured in the voltage measuring process, is kept within the predetermined voltage range described above.

Next, the charging/discharging control process when the power generator 3b is not generating power (or in a "generation stopped state") will be described.

In the charging/discharging control process, since the generated power W2 is substantially zero, the energy management system 9 executes the same operation as when the generated power W2 is smaller than the total load power (WLa+WLb) described above. Accordingly, the energy management system 9 first detects whether there are any DC power supplies 6 with dischargeable storage batteries 11 based on the battery information acquired from the BMUs 12 of the respective DC power supplies 6 and when such a DC power supply 6 exists, specifies and causes the DC power supply 6 to perform a discharging operation to produce a state where it is possible for the DC/DC converters 5a and 5b to generate the load voltages VLa and VLb for the corresponding load appliances 71a and 71b.

Accordingly, when there is a DC power supply 6 aside from the DC power supply $6_1$ as a DC power supply 6 with a dischargeable storage battery 11, first, the storage batteries 11 of these DC power supplies 6 aside from the DC power supply $6_1$ are discharged until their SOCs reach the lower limit value and then the storage battery $11_1$ of the DC power supply $6_1$ is discharged until the SOC falls to the specified first lower limit value. In this way, the energy management system 9 executes charging/discharging control to discharge the respective storage batteries 11 so that the SOC of the specified storage battery $11_1$ is always higher than the SOCs of the other storage batteries $11_2$ to $11_n$. This means that it will be possible for the storage battery $11_1$ to supply the DC/DC converter 7 with power for generating the operating voltage Vop for a sufficiently long period while the SOC falls from the specified first lower limit value to the lower limit value.

In this way, in the DC power supplying system 1, the energy management system 9 is configured to operate on the charging power of specified storage batteries (in the present embodiment, the storage battery $11_1$) out of the plurality of storage batteries 11 (in more detail, to operate on the operating voltage Vop outputted from the DC/DC converter 7 based on this charging power). The energy management system 9 controls charging/discharging operations (power converting operations) of the plurality of bidirectional DC/DC converters $14_1$ to $14_n$ so that the SOC of the specified storage battery $11_1$ is always higher than the SOCs of the other storage batteries $11_2$ to $11_n$ out of the plurality of storage batteries 11. Also by the energy management system 9, supplying of power to the DC bus 2 from the other storage batteries $11_2$ to $11_n$ is executed with priority over the supplying of power to the DC bus 2 from the specified storage battery $11_1$, and when the respective SOCs of the other storage batteries $11_2$ to $11_n$ have fallen below the lower limit value (a value set in advance at a point just before over-discharging occurs) due to the supplying of power to the DC bus 2, the supplying of power to the DC bus 2 from the other storage batteries 11 by the corresponding bidirectional DC/DC converters 14 is stopped.

Accordingly, according to the DC power supplying system 1, since the SOC of the specified storage battery $11_1$ whose charging power is used to operate the energy management system 9 is always higher than the SOCs of the other storage batteries $11_2$ to $11_n$, unlike a configuration where all of the storage batteries 11 are used equally to supply power to the DC bus 2, it is possible to sufficiently extend the time required for the SOC of the specified storage battery $11_1$ to fall to the lower limit value, that is, it is possible to sufficiently extend the time for which the energy management system 9 can be kept in the operating state. Also, since the DC power supplying system 1 is configured so that when supplying power to the DC bus 2, the other storage batteries $11_2$ to $11_n$ are discharged with priority and supplying of power to the DC bus 2 is stopped when the SOC reaches the lower limit value, it is possible to make effective use of the charging power of the other storage batteries $11_2$ to $11_n$ right up to a point just before over-discharging occurs, while reliably avoiding a situation where the other storage batteries $11_2$ to $11_n$ become over-discharged.

Also, according to this DC power supplying system 1, since the DC/DC converter 7 that generates and outputs the operating voltage Vop based on the charging power of the specified storage battery $11_1$ is provided, even when the SOC of the specified storage battery $11_1$ has changed (that is, when the charging voltage Vba of the specified storage battery $11_1$ has changed), it is still possible to stably output the operating voltage Vop of a variety of voltage values that are used by the BMU 12 and the contactor 13 of each DC power supply 6 and the energy management system 9. Although the DC power supplying system 1 has a preferred configuration including the DC/DC converter 7, when the operating voltage ranges of the BMU 12 and the contactor 13 of each DC power supply 6 and/or the energy management system 9 are sufficiently wide (that is, wider than the range of changes of the charging voltage Vba of the specified storage battery $11_1$), it is also possible to use a configuration where the DC/DC converter 7 is omitted and the charging voltage Vba of the specified storage battery $11_1$ is directly supplied to the BMU 12 and the contactor 13 of each DC power supply 6 and/or the energy management system 9.

Note that although the DC power supplying system 1 uses a configuration where in each DC power supply 6, a contactor 13 is disposed between the storage battery 11 and the corresponding bidirectional DC/DC converter 14, the bidirectional DC/DC converter 14 always operates on the bus voltage Vbs, and it is possible to disconnect the storage battery 11 and the corresponding bidirectional DC/DC converter 14 (that is, to disconnect the storage battery 11 and the DC bus 2), it is also possible to configure the energy management system 9 to output a stopping instruction as control information to each bidirectional DC/DC converter 14, and to configure each bidirectional DC/DC converter 14 so as to be capable of stopping its own operations and entering a sleep state with reduced power consumption when the control information is a stopping instruction. Note that with this configuration, when a charging instruction or a discharging instruction is received as control information during a sleep state, the bidirectional DC/DC converter 14 is configured to exit the sleep state and execute a charging operation or a discharging operation.

According to the DC power supplying system 1 with this configuration, by outputting a stopping instruction as control information to the bidirectional DC/DC converters 14 of DC power supplies 6 that have stopped supplying power of the storage batteries 11 to the DC bus 2, it is possible to place these bidirectional DC/DC converters 14 in the sleep state and reduce power consumption. By doing so, it is possible to reduce the power consumption of the DC power supplying system 1 as a whole.

Also, in a configuration like this where it is possible to stop the bidirectional DC/DC converter 14 of a DC power supply 6, it is possible to stop the supplying of power from the corresponding storage battery 11 to the DC bus 2 by stopping the bidirectional DC/DC converter 14, so that although not illustrated, it is also possible to use a configuration where the contactors 13 are omitted and the storage batteries 11 and the corresponding bidirectional DC/DC converters 14 are directly connected to each other. Also, with this configuration, the bidirectional DC/DC converter 14 may be configured to operate on any of the bus voltage Vbs and the charging voltage Vba of the storage battery 11.

INDUSTRIAL APPLICABILITY

According to the present invention, it is possible to make more effective use of the power charged in a plurality of storage batteries while sufficiently extending the time for which a controller can be kept in the operating state. This means that the present invention can be widely applied in standalone DC power supplying systems that require storage batteries.

REFERENCE SIGNS LIST

1 DC power supplying system
2 DC bus
3a, 3b Power generator
4b First converter
5a, 5b Second converter
9 Energy management system
$11_1$ to $11_n$ Storage battery
$14_1$ to $14_n$ Bidirectional DC/DC converter
71a, 71b Load appliance
W2 Generated power
W1a, W1b Load power

The invention claimed is:

1. A standalone direct current (DC) power supplying system that is not connected to commercial power, comprising:
a DC bus that serves as a bus line for supplying power; a power generator;
a first converter that supplies generated power generated by the power generator to the DC bus;
a plurality of storage batteries;
a plurality of bidirectional converters that are each connected between one of the plurality of storage batteries and the DC bus, each bidirectionally convert power between the generated power supplied to the DC bus and charging power for the corresponding storage battery, and each supply power from the DC bus to the storage battery and from the storage battery to the DC bus;

a second converter that converts DC power that is at least one of the generated power and the charging power supplied to the DC bus to a DC voltage and supplies the DC voltage to a load appliance; and a controller that operates on the charging power of a specified storage battery out of the plurality of storage batteries to control power converting operations of the plurality of bidirectional converters, wherein the controller controls the power converting operations of the plurality of bidirectional converters so that an SOC of the specified storage battery is always higher than SOCs of other storage batteries out of the plurality of storage batteries, executes supplying of power from the other storage batteries to the DC bus with priority over supplying of power from the specified storage battery to the DC bus and, when the SOCs of the other storage batteries have fallen below a lower limit value set in advance due to supplying of power to the DC bus, causes the corresponding bidirectional converters to stop supplying of power from the other storage batteries to the DC bus.

2. The DC power supplying system according to claim 1, wherein the plurality of bidirectional converters operate on the charging power of the corresponding storage batteries out of the plurality of storage batteries, and the controller stops the bidirectional converters corresponding to the other storage batteries whose SOC has fallen below the lower limit value.

3. The DC power supplying system according to claim 1, further comprising a third converter that converts the charging power of the specified storage battery to an operating voltage of the controller and outputs the operating voltage.

4. The DC power supplying system according to claim 2, further comprising a third converter that converts the charging power of the specified storage battery to an operating voltage of the controller and outputs the operating voltage.

* * * * *